Jan. 18, 1944.                J. A. CAMPBELL                2,339,457
                              PULSATION DAMPENER
                             Filed April 16, 1941
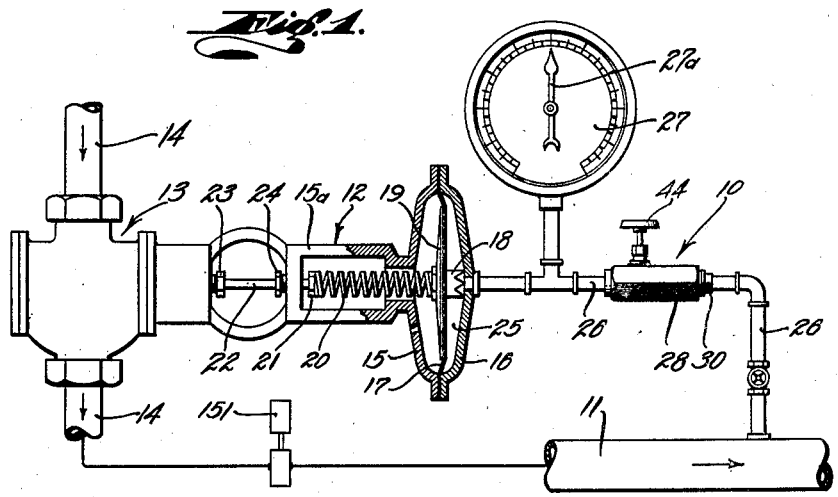
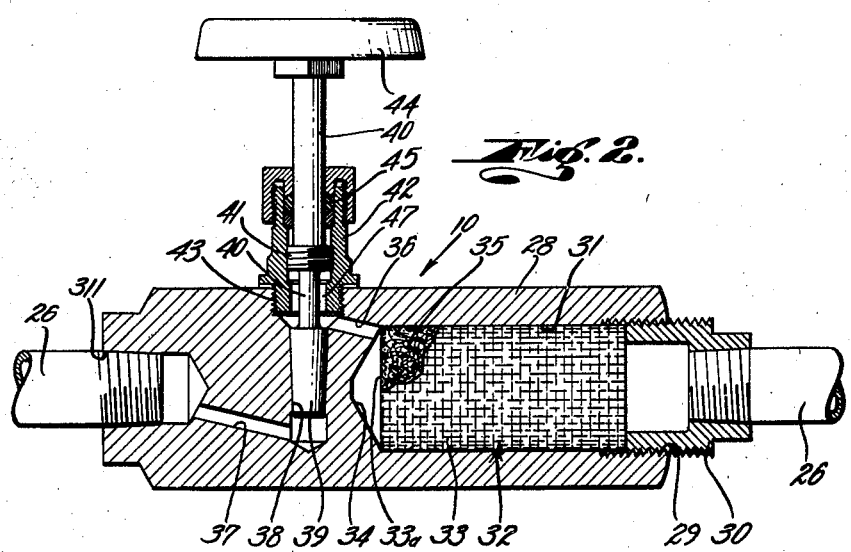
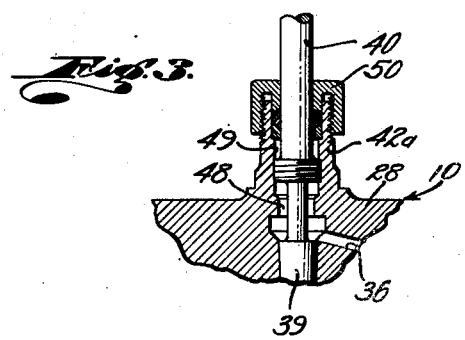
Inventor
JULIAN A. CAMPBELL
H. Calvin White
Attorney Patented Jan. 18, 1944

2,339,457

UNITED STATES PATENT OFFICE 2,339,457

PULSATION DAMPENER

Julian A. Campbell, Long Beach, Calif.

Application April 16, 1941, Serial No. 388,904

5 Claims. (Cl. 251—27)

This invention has to do generally with systems for preventing or dampening vibrations of a pressure responsive element or device which is subject to vibrations or fluctuations by or in accordance with a source of pulsating fluid pressure. More particularly, the invention is concerned with an improved pressure impulse dampening device adapted to be installed in a line interconnecting the element subject to vibration, with the source of pulsating fluid pressure.

Merely as illustrative of one of its many adaptations and embodiments, the invention may be described with reference to a pump control system in which the supply of operating fluid, such as steam, to the pump, is controlled by a valve which in turn is regulated by a governor, e. g. of the spring and diaphragm type, operated in accordance with the pressure in the pump discharge line. In this instance the functions of the valve and governor may be to maintain a predetermined constant pressure of the fluid discharged by the pump. Where a reciprocating type pump is used, the discharge pressure may have pulsations of some magnitude, and which, in the absence of a dampener, would be communicated to the governor and pump control valve, with resultant vibrations or fluctuations of both in accordance with pulsations of the pump discharge pressure.

Aside from the undesirable instability of the control system under these conditions, there are other disadvantages affecting not only the operating efficiency and continued accuracy of the control equipment, but also its durability and resistance to fatigue. To illustrate, operation of the usual diaphragm regulator without an efficient pulsation dampener, causes the spring and diaphragm to undergo continuous flexing and the connected valve stem to have repeated reciprocations in its packing gland, with successive strokes of the pump. As a result, the spring may rapidly crystallize and the diaphragm soon fail through fatigue, disrupting the operation of the entire control system. The stem packing wears very rapidly so that it is impossible to eliminate leakage around the stem, except by frequent adjustments. Gauges recording the regulator pressure are subjected to severe use and soon rendered inaccurate in their readings, by reason of fatigue and wear of the gauge parts under continuous pressure pulsations.

My general object is to provide an improved pulsation dampener that will permit prompt and accurate response of the controlled element to relatively stable variations in the controlling fluid pressure, and yet prevent transmission to the controlled equipment of pulsations or unstable variations in such pressure. Under the influence of the present dampener, the controlled parts will be found to move smoothly in response to relatively stable pressure changes of the controlling fluid, and to remain unaffected by mere pulsations. This object is accomplished by placing in the pressure communicating line a valvular device comprising a body designed to resist expansion under high internal fluid pressures, and containing a valve, preferably elongated, having a slight taper and movable longitudinally within a correspondingly shaped bore in the body. When the valve is slightly disengaged from the bore wall, as in normal use, pressure communication through the dampener occurs by way of a very narrow elongated passage between the valve and the bore wall.

Heretofore it has been proposed to dampen the pressure pulsations by use of ordinary valves slightly opened to permit only restricted passage of the fluid. These have proven relatively unsuccessful because of the fact that, particularly where the controlling fluid pressures are high, even a slight reduction of the pressure will relieve the valve body strain, or valve stem and thread compression, to the extent of closing and rendering the valve inoperative. In the present dampener, the valve and its bore are so dimensioned and given such slight taper, that the degree of longitudinal movement of the valve resulting from stem or thread compression, or the effects of variations of the body strain, will be minimized to the extent that the control system is unaffected. Whereas other types of dampeners require replacement of parts that have become scored as a result of high velocity fluid flow, scoring of either the valve or its seat in the present device can be eliminated simply by tightly closing the valve a few times so as to grind or press out the scorings. Finally, the extremely close adjustability of the valve enables it to be quickly and accurately regulated to accommodate fluids of different viscosities, i. e., to maintain variable clearances required for proper pressure communication by fluids whose viscosities may vary widely.

A further feature of the invention is the incorporation in the valve body of a filter assuring removal of all dirt particles from the fluid before it reaches the valve-controlled passage, thus eliminating any scoring of the valve or its seat by foreign particles that might otherwise be ground into them.

The various features and objects of the invention referred to in the foregoing, as well as the details of a typical and illustrative embodiment thereof, will be understood to better advantage from the description to follow. References are had throughout the description to the accompanying drawing in which:

Fig. 1 is a general view, partly in section, showing an illustrative pressure control system employing the present pulsation dampener;

Fig. 2 is an enlarged view showing the pulsation dampener in longitudinal section; and Fig. 3 is a sectional illustration of a variational form of the valve packing gland and its connection with the valve body.

Referring first to Fig. 1, the pulsation dampener, generally indicated at 10 is shown in this typical instance to dampen the pulsations communicated from a fluid pressure source such as line 11, to a regulator generally indicated at 12 which controls the operation of a valve 13 in accordance with pressure variations of the fluid in line 11. The regulator system shown may be used, as in the illustration, to control the supply of fluid through line 14 to a pump 151, in accordance with the pressure in line 11 at the discharge side of the pump, all in a manner permitting the discharge pressure to be held substantially constant except for pulsations produced by the pump operation. The regulator 12 is shown conventionally to comprise hollow body sections 15 and 16 between which is clamped a flexible diaphragm 17, displacement of which in one direction is arrested by a stop 18 carried by the rigid disk center 19 of the diaphragm. Opposite displacement of the diaphragm is resisted by coil spring 20 bearing against nut 21 carried on the end of rod 22 which operates the valve proper, not shown, within the valve body 13. Fluid leakage from the valve body along the rod is prevented by the usual packing gland 23, and the rod is supported within the yoke of diaphragm body section 15a, by a suitable bushing or bearing 24. The diaphragm chamber 25 is connected by pipe 26 carrying a pressure gauge 27, with the discharge line 11, so that the diaphragm and valve rod 22 through coil spring 20, are rendered responsive to variations in the discharge pressure.

In the absence of the pulsation dampener, the usual effect of continued pulsations of the discharge pressure is to rupture the diaphragm as a result of fatigue through repeated flexure, and to produce crystallization in the spring 20 for the same reason. The resultant reciprocation of the rod 22 causes the packing in gland 23 to wear so rapidly that it is impossible to maintain a fluidtight seal without almost constant adjustment of the gland. There is also produced a continuous vibration of the gauge arm 27a and pressure-responsive parts of the gauge, causing the latter to develop early failures and inaccuracies in its measurements. As heretofore explained, the primary function of the pulsation dampener is to eliminate transmission to the pressure-responsive parts beyond, of pulsations or relatively abrupt and frequent pressure variations of the fluid in line 11, and yet enable these parts to remain promptly and accurately responsive to relatively permanent or stable changes in the discharge line pressure.

Referring to Fig. 2, the pulsation dampener 10 comprises an elongated body 28 having a threaded inlet 29 connected by an adapter 30 into the valved line 26. The opposite end of the body has an outlet 311 interiorly threaded to receive the section of line 26 leading to the regulator 12. The inlet 29 desirably may be formed coaxially with an enlarged bore 31 containing a suitable filter 32 which may be of any suitable form and construction. Typically, the filter is shown to comprise a cylindric screen 33 snugly fitted into the bore 31 and having a screen end 33a held against the tapered end 34 of the bore by tightening the adapter 30 against the opposite end of the filter. The interior of the screen 32 may be left open or filled with a suitable foraminous filtering material 35.

The filter bore 31 and outlet 311 are communicable through passages 36 and 37 and a transverse bore 38, under control of a rotatable and longitudinally movable valve 39. As illustrated, the body walls are thickly formed as compared with the diameter of the bore 38, for the purpose of maintaining at a minimum any variation in that diameter as the result of variations of the fluid pressure inside the body. To serve this same purpose, the valve bore 38 is drilled transversely in the body so that relatively thick portions of the body metal will resist changes in the valve bore diameter due to pressure variations. The valve 39 preferably is elongated to an extent that its length is a plurality of times its diameter, and the corresponding length of bore 38 is similarly proportioned, so that when the valve is slightly opened, as during normal operation, the pressure from discharge line 11 is communicated to the regulator 12 by way of an elongated, very narrow annular passage between the valve and the bore wall.

The valve 39 and bore 39 have corresponding longitudinal tapers in the direction of closing movement of the valve, the degree of taper being highly important in order to maintain a large ratio between longitudinal movement of the valve and variation in the clearance of the valve from its bore for a given rotational adjustment of the valve. For best results, the valve and bore taper should not exceed about one degree, and I preferably limit the taper to about thirty-five minutes, thereby permitting within the range of rotational adjustment of the valve, control of the clearance about the valve within increments of thousandth fractions of an inch. Thus in order to adapt the pulsation dampener to pressure transmissions by fluids of different viscosities, the adjustability of the valve to give clearance variations of the smallest order, permits controlling that clearance to suit exactly the viscosity of the fluid, and without enlarging the passage to the extent that pressure pulsations would be transmitted to the regulator. Another important advantage of the slight valve and bore taper is that in the event scoring occurs on the surface of either the valve or the bore, such scoring can be ground or pressed out without having to remove the valve, simply by closing the valve two or three times into tight engagement with the bore.

The valve 39 may be formed integrally with a stem 40 which, in the form of Fig. 2, is threaded at 41 into a gland housing 42 threaded or otherwise attached to the body at 43. The threads 41 preferably are formed at small pitch, say eighteen threads to the inch, permitting close longitudinal adjustment with the valve for an increment of turning by the handle 44. The valve stem is packed against fluid leakage by the usual form of gland indicated at 45. The valve 39 may be withdrawn from the body by removal of the housing 42, or by making the bore 47 sufficiently large to permit withdrawal of the valve through the housing after removing the packing gland 45. In Fig. 3, the housing 42a is shown to be formed integrally with the body 28, and to permit removal of the valve through bores 48 and 49 after unscrewing the gland nut 50.

In operation, filter 32 removes from the pressure-communicating fluid, any solid particles that might otherwise clog the restricted passage about the valve. Due to the degree to which the pressure-communicating passage is restricted by the valve, and the length of the valve-formed restriction, pressure pulsations from line 11 are dampened, or in effect dissipated, in advance of the regulator and pressure gauge, so that all pressure-responsive parts remain stable and have deliberate movements. In an average instance, using pressure-transmitting fluid of low viscosity, the valve will function properly to dampen pulsations and yet transmit stable pressure changes, at a clearance from the valve bore of about .0004 in. Finally, it will be observed that should fluid pressure changes produce slight longitudinal expansion or compression of the valve, its inner stem and the stem threads, the resultant changes in the valve position will have no appreciable effect on the restrictions to fluid flow past the valve. Because of the slight valve and bore taper, the changes in the clearance about the valve under such conditions will be inconsequential.

I claim:

1. For use in combination with a pressure responsive element subject to vibrations by a source of pulsating fluid pressure, a flow restrictor adapted to be installed in a line connecting said element with such fluid pressure source, said restrictor comprising a metallic body having an inlet and an outlet and thick walls to resist expansion under high internal pressure, said body containing a bore communicating with said inlet and outlet, and an elongated valve movable longitudinally within the bore, said valve and bore having corresponding slight longitudinal tapers not in excess of substantially one degree so that when the valve is slightly disengaged from the bore wall, said inlet and outlet are in communication through a very narrow elongated passage between the valve and bore and remain in such communication during variations of the internal body pressure tending by deformation of the restrictor parts to close the valve.

2. For use in combination with a pressure responsive element subject to vibrations by a source of pulsating fluid pressure, a flow restrictor adapted to be installed in a line connecting said element with such fluid pressure source, said restrictor comprising a metallic body having an inlet and an outlet and thick walls to resist expansion under high internal pressure, said body containing a bore communicating with said inlet and outlet, and an elongated valve movable longitudinally within the bore, said valve and bore having corresponding slight longitudinal tapers of substantially thirty-five minutes so that when the valve is slightly disengaged from the bore wall, said inlet and outlet are in communication through a very narrow elongated passage between the valve and bore and remain in such communication during variations of the internal body pressure tending by deformation of the restrictor parts to close the valve.

3. For use in combination with a pressure responsive element subject to vibrations by a source of pulsating fluid pressure, a flow restrictor adapted to be installed in a line connecting said element with such fluid pressure source, said restrictor comprising a metallic body having an inlet and an outlet and thick walls to resist expansion under high internal pressure, said body containing a bore communicating with said inlet and outlet, and an elongated valve movable longitudinally within the bore, said valve and bore having corresponding slight longitudinal tapers not in excess of substantially one degree so that when the valve is slightly disengaged from the bore wall, said inlet and outlet are in communication through a very narrow elongated passage between the valve and bore and remain in such communication during variations of the internal body pressure tending by deformation of the restrictor parts to close the valve, the corresponding tapered lengths of said bore and valve being a plurality of times their diameters.

4. For use in combination with a pressure responsive element subject to vibrations by a source of pulsating fluid pressure, a flow restrictor adapted to be installed in a line connecting said element with such fluid pressure source, said restrictor comprising a metallic body having an inlet and an outlet and thick walls to resist expansion under high internal pressure, said body containing a bore communicating with said inlet and outlet, and an elongated valve movable longitudinally within the bore, said valve and bore having corresponding slight longitudinal tapers not in excess of substantially one degree so that when the valve is slightly disengaged from the bore wall, said inlet and outlet are in communication through a very narrow elongated passage between the valve and bore, a stem connected to the valve, a stem packing housing applied to the body, and interengaging screw threads for moving the valve longitudinally as it is rotated by the stem, the valve taper being sufficiently small that said communication between the inlet and outlet is maintained during variations of the internal body pressure tending to close the valve by deformation of said body, stem and threads.

5. For use in combination with a pressure responsive element subject to vibrations by a source of pulsating fluid pressure, a flow restrictor adapted to be installed in a line connecting said element with such fluid pressure source, said restrictor comprising an elongated metallic body having thick walls to resist expansion under high internal pressure, said body containing a longitudinal bore and a transverse bore beyond the longitudinal bore and a passage interconnecting said bores, a filter within said longitudinal bore, an outlet bore alined with said longitudinal bore at the opposite side of the transverse bore and having a communication with said transverse bore, and a valve movable longitudinally within said transverse bore, said valve and transverse bore having corresponding slight longitudinal tapers not in excess of substantially one degree so that when the valve is slightly disengaged from the bore wall, the filter-containing bore is in communication with said outlet through a narrow clearance space about the valve and remain in such communication during variations of the internal body pressure tending by deformation of the restrictor parts to close the valve.

JULIAN A. CAMPBELL.